United States Patent [19]

Morishita et al.

[11] Patent Number: 4,986,140
[45] Date of Patent: Jan. 22, 1991

[54] DRAY TORQUE RELATIONSHIP OF A UNDIRECTIONAL CLUTCH IN AN ENGINE STATER MOTOR

[75] Inventors: Akira Morishita; Shuzoo Isozumi, both of Himeji, Japan

[73] Assignee: Mitsubishi Denki Kabushiki Kaisha, Tokyo, Japan

[21] Appl. No.: 444,264

[22] Filed: Dec. 1, 1989

[30] Foreign Application Priority Data

Dec. 2, 1988 [JP] Japan .................. 63-306568

[51] Int. Cl.$^5$ .............................. F02N 15/00
[52] U.S. Cl. ..................... 74/7 C; 74/7 A; 74/7 E; 192/45
[58] Field of Search ............... 74/7 E, 7 C, 7 R, 7 A, 74/7 B; 192/45

[56] References Cited

U.S. PATENT DOCUMENTS

| | | | |
|---|---|---|---|
| 2,561,940 | 7/1951 | Metsger | 74/7 C |
| 3,958,678 | 5/1976 | Jetee | 192/44 |
| 4,412,457 | 11/1983 | Colvin et al. | 74/7 A |
| 4,440,033 | 4/1984 | Kurihara et al. | 74/7 A |
| 4,587,861 | 5/1986 | Morishita | 74/7 E |
| 4,592,243 | 6/1986 | Katoh et al. | 7 C, 7 E |
| 4,604,907 | 8/1986 | Morishita et al. | 74/7 E |
| 4,738,148 | 4/1988 | Norton | 74/7 R |
| 4,881,416 | 11/1989 | Isozumi | 74/7 A |

FOREIGN PATENT DOCUMENTS 73315 6/1977 Japan .
2895 9/1985 Japan .

OTHER PUBLICATIONS

Heldt, Torque Converters or Transmissions, 1942, pp. 88–100, Over-Running Clutches.

*Primary Examiner*—Allan D. Herrmann
*Assistant Examiner*—David W. Laub
*Attorney, Agent, or Firm*—Sughrue, Mion, Zinn, Macpeak & Seas

[57] ABSTRACT

An engine starter motor comprising an electric motor, a unidirectional clutch connected to the motor and having an output shaft, the unidirectional clutch exhibiting a drag torque appearing when the unidirectional clutch is being rotated in an idle direction, a speed reduction unit connected to the unidirectional clutch, and a pinion shaft having a pinion gear for engaging and driving an engine ring gear and connected to the speed reduction unit through helical splines. The drag torque T of the unidirectional clutch is determined to be equal to or smaller than a drag torque To, at which a return force F on the pinion shaft with an over-running clutch mounted thereon does not exceed an operating force on the pinion shaft by a solenoid, divided by a speed reduction ratio g between the over-running clutch and the pinion shaft.

3 Claims, 3 Drawing Sheets

$$R = P \frac{\cos(\gamma - \alpha)}{\sin \alpha}$$

DRAY TORQUE RELATIONSHIP OF A UNIDIRECTIONAL CLUTCH IN AN ENGINE STATER MOTOR

BACKGROUND OF THE INVENTION

This invention relates to an engine starter motor for starting an engine and particularly to an engine starter motor having a speed reduction gear between a unidirectional clutch and a pinion gear.

An engine starter motor is known, in which the rotational speed of an electric motor is reduced by one or two stages, an electric motor unit is reduced in size and weight, and in which an unidirectional (over-running) clutch is mounted to a speed-reduced pinion shaft. In the engine starter motor of this structure, the effect of the inertia moment of the electric motor on the unidirectional clutch increases by the square of the speed reduction ratio as it increases. Therefore, a disadvantageously large capacity unidirectional clutch is required for an engine starter motor having no speed-reduction mechanism, in which the rotation of the armature rotary shaft is directly transmited to the unidirectional clutch.

Therefore, there has been proposed an engine starter motor such as disclosed in Japanese Patent Laid-Open No. 52-73315 in which an over-running clutch is disposed on an armature rotary shaft as well as an engine starter motor such as disclosed in Japanese Patent Laid-Open No. 60-2895 in which an over-running clutch is disposed on an idle shaft in order to eliminate the above-discussed disadvantages of the conventional design.

FIG. 1 illustrates the engine starter motor disclosed in Japanese Patent Laid-Open No. 52-73315, in which reference numeral 1 indicates a d.c. motor, 2 indicates an armature of the d.c. motor 1, and 3 indicates an armature rotary shaft. An over-running (unidirectional) clutch 4 is mounted to the armature rotary shaft 3, and a clutch outer member 5 of the over-running clutch 4 is secured to the armature rotary shaft 3 by splines 6 and a clutch inner member 9 having a pinion gear 8 of a speed reduction gear 7 is mounted on the armature rotary shaft 3 rotatable relative to it. Rollers 10 are interposed between the clutch outer member 5 and the clutch inner member 9, and 11 indicates a cover. Reference numeral 12 indicates a larger gear which is in mesh with the pinion gear 8 and which has a pinion shaft 13 centrally engaged through helical splines 14 on the pinion shaft 13. A front end portion of the pinion shaft 13 has mounted thereon a pinion 16 which is enagageable with an engine ring gear 15, and a rear end portion of the pinion shaft 13 has mounted thereto a stopper 17 for positioning the forward position of the pinion shaft 13 and a return spring 18 disposed between the stopper 17 and the large gear 12. A lever 19 transmits a drive force from a plunger 20 of the solenoid.

In the engine starter motor with the above structure, when the plunger 20 is actuated by an electromagnetic attraction, the lever 19 rotates in the clockwise direction as viewed in the figure, the pinion shaft 13 is driven in the forward direction against the spring action of the return spring 18 to cause the pinion 16 to mesh with the engine ring gear 15. Also, the rotation of the armature rotary shaft 3 is transmitted through the unidirectional clutch 4, the smaller gear 8, the larger gear 12, the splines 14 and the pinion shaft 13 to the engine ring gear 15 to start the engine. The torque applied to the unidirectional clutch 4 is the maximum torque generated by the electric motor 1, and the torque at the pinion gear 16 is equal to the torque generated by the electric motor 1 multiplied by the speed reduction ratio between the small gear 8 and the large gear 12. Also, while the effect of the inertia moment of the rotating armature 2 only directly acts on the uni-directional clutch 4 which is directly connected to the armature 2, it acts on the pinion 16 as increased by a factor of the square of the speed reduction ratio.

After the engine is started and the plunger 20 is released, the action of the return spring 18 causes the shift lever 19, the pinion shaft 13 and the pinion 16 to return to their original positions, whereby the operation of the engine starter motor is stopped.

FIG. 2 illustrates an engine starter motor disclosed in Japanese Patent Laid-Open No. 60-2895. In the FIGURE, an idle shaft 21 is disposed on an axis different from those of an armature rotary shaft 3 and a pinion shaft 13, and the unidirectional clutch 4 is rotatably supported on this idle shaft 21. On the outer circumference of the clutch outer member 5 of the unidirectional clutch 4, a speed reducing gear 5a is formed so that it engages a gear 3a formed in the armature rotary shaft 3. Also, a small gear 8 integral with the clutch inner member 9 is in engagement with a large gear 12 formed on a tube 22, thereby forming a speed-reduction gear 7, and the tube 22 and the pinion shaft 13 are spline-engaged to each other through helical splines 14. Reference numerals 23, 24 indicate a housing and a center bearing support, respectively, for supporting the armature rotary shaft 3, the idle shaft 21 and the pinion shaft 13.

Reference numberal 25 indicates a solenoid switch, 26 indicates a plunger of the solenoid switch 25, 27 indicates a rod constructed to move together with the plunger 26, 28 indicates a movable contact, 29 indicates stationary contacts one of which is connected to a battery (not shown) and the other of which is connnected to a d.c. motor 1. Reference numeral 30 indicates a ball interposed between the rod 27 and the pinion shaft 13. In the figure, the same reference numerals used also in FIG. 1 indicate identical or corresponding components, so that their explanation is omitted.

In the engine starter motor as above constructed, the starting operation is achieved in a manner similar to that of the starter shown in FIG. 1, and the transmission torque of the unidirectional clutch 4 equals to the torque of the d.c. motor 1 multiplied by the speed-reduction ratio between the gear 3a and the speed reducing gear 5a, and further even though the effect of the inertia moment of the d.c. motor 1 acting on the unidirectional clutch 4 is increased by a factor of the square of the speed-reduction ratio, this effect is smaller than that where the unidirectional clutch 4 is mounted on the pinion shaft 13.

In the conventional engine starter motor, it has been attempted to reduce the effect of the speed-reduction ratio of the unidirectional clutch 4 and to use the unidirectional clutch 4 in common with the engine starter having no speed reduction gear.

However, since the pinion shaft 13 of the conventional engine starter is engaged with the speed-reduction gear components by the helical splines, a return force is generated on the pinion shaft 13 when the pinion 16 is driven by the engine immediately after the engine is started or when the engine starter motor cannot quickly follow the change in rotation of the engine. That is, when a drag torque which causes the unidirectional clutch 4 to rotate in the idling direction is considered as to the pinion shaft 13, this drag torque is increased by an amount corresponding to the speed-reduction ratio between the unidirectional clutch 4 and the pinion shaft 13. As shown in FIG. 3, the return force F can be expressed by:

$$F = \tan(\theta - \rho) T / r_H$$

where,
T: drag torque
$r_H$: mean diameter of the helical splines 14
$\theta$: twist angle of the helical splines 14
N: drag
$\tau$: friction angle of the helical splines 14.

Accordingly, when a unidirectional clutch similar to that of an engine starter with no speed reduction mechanism is used as in the above conventional engine starter, the drag torque as considered from the pinion shaft 13 is increased by an amount corresponding to the speed-reduction ratio and the return force F is also increased accordingly. Therefore, the return force F exceeds the electromagnetic attractive force on the plunger 20 or 26, causing the pinion 16 to return and disengage from the ring gear 15, and if the engine starter motor is being energized at this time and plunger 20 or 26 is being electromagnetically actuated, the pinion 16 is again driven into mesh with the engine ring gear 15. Even when the pinion 16 did not completely disengage from the engine ring gear 15, the pinion 16 moves fiercely, resulting in large mechanical impacts which may destroy or damage the ring gear 15 and other components and generate noise.

SUMMARY OF THE INVENTION

Accordingly, one object of the present invention is to provide an engine starter motor free from the above-discussed problems of the conventional engine starter motor.

Another object of the present invention is to provide an engine starter motor in which a large return force does not appear on the pinion even when the starter is driven by the started engine.

Still another object of the present invention is to provide an engine starter motor in which the operating life of the motor is elongated.

Still a further object of the present invention is to provide an engine starter motor in which the undesirable movement of the pinion is eliminated.

With the above objects in view, the engine starter motor of the present invention comprises an electric motor, a unidirectional clutch connected to the motor and having an output shaft, the unidirectional clutch exhibiting a drag torque appearing when the unidirectional clutch is being rotated in an idle direction, a speed reduction unit connected to the unidirectional clutch, and a pinion shaft having a pinion gear for engaging and driving an engine ring gear and connected to the speed reduction unit through helical splines. The arrangement being such that the drag torque T of the unidirectional clutch is equal to or smaller than a drag torque To, at which a return force F on the pinion shaft with an over-running clutch mounted thereon does not exceed an operating force on the pinion shaft by a solenoid, divided by a speed reduction ratio g between the over-running clutch and the pinion shaft.

The unidirectional clutch may comprise a clutch outer member, a clutch inner member, a plurality of rollers disposed between the clutch outer member and the clutch inner member for frictionally connecting the clutch outer and inner members, and springs for urging the rollerrs into frictional engagement with the clutch outer and inner members. The drag torque T of the unidirectional clutch may be expressed by the following equation:

$$T = P \frac{\cos(\gamma - \alpha)}{\sin \alpha} \times n \times r \times \mu$$

where,
P: spring force
$\alpha$: angle defined between the frictional surfaces of the clutch outer an inner members
$\gamma$: angle of direction of a spring force with respect to a tangent at the point of contact of the roller to a frictional surface of clutch inner member
n: number of rollers
r: outer diameter of the clutch inner member
$\mu$: friction coefficient of the roller contacting surfaces.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 4:
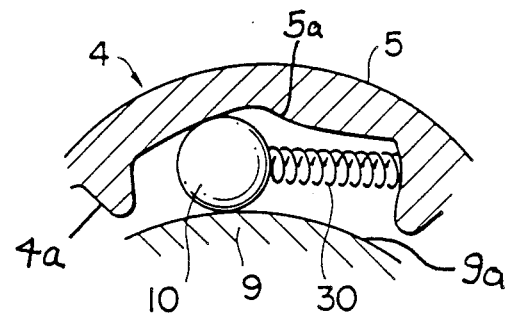
FIG. 4 is a schematic diagram illustrating one portion of the unidirectional clutch of the engine starter of the present invention.
Figure 5:
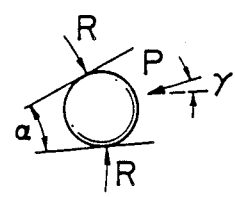
FIG. 5 is a diagram showing the relationships between the forces acting on the roller disposed within the wedge-shaped space defined between the clutch outer member and the clutch inner member of the unidirection clutch.

FIG. 4 illustrates one portion of a unidirectional clutch 4 or an over-running clutch of an engine starter motor of the present invention, and FIG. 5 illustrates a relationship of forces and angles in relation to the roller of the unidirectional clutch 4.

Figure 1:
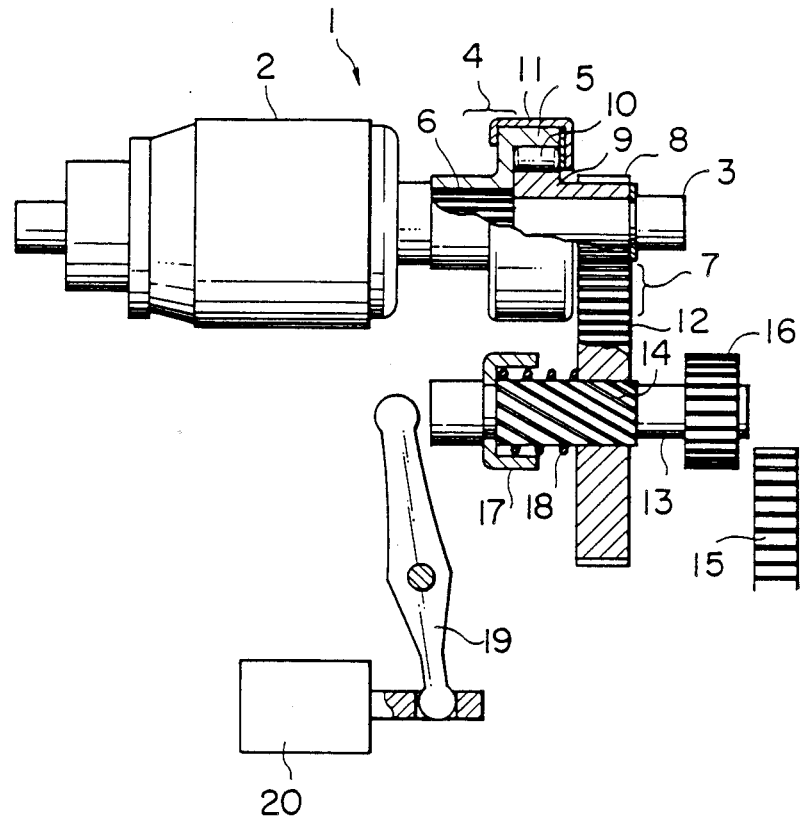
FIG. 1 is a schematic sectional diagram illustrating one example of the engine starter motor to which the present invention can be applied.
Figure 2:
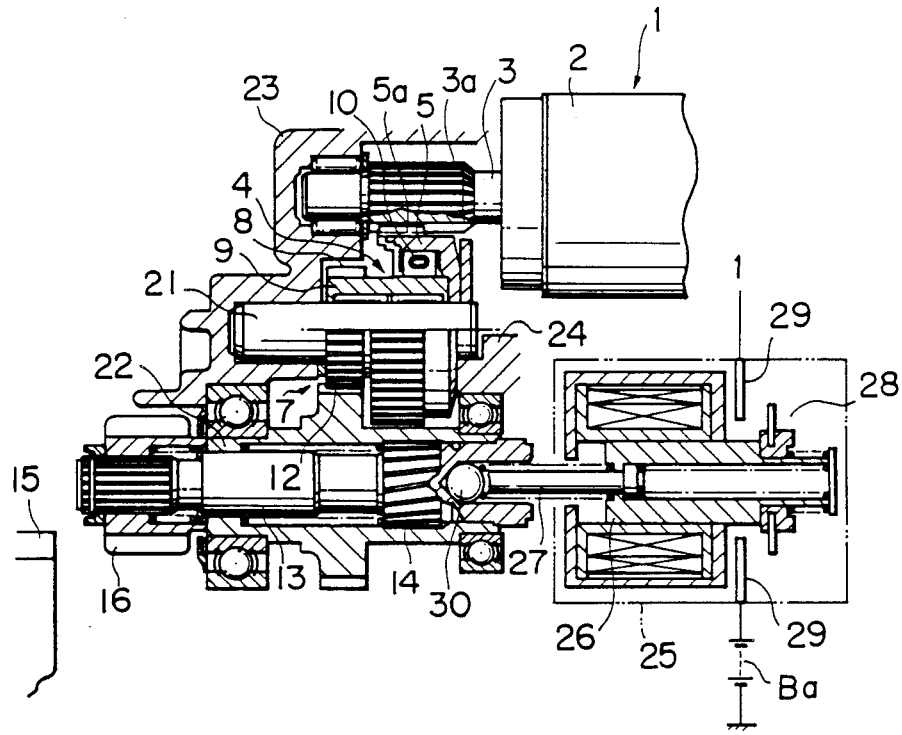
FIG. 2 is a schematic sectional diagram illustrating another example of the engine starter motor to which the present invention can be applied.
Figure 3:
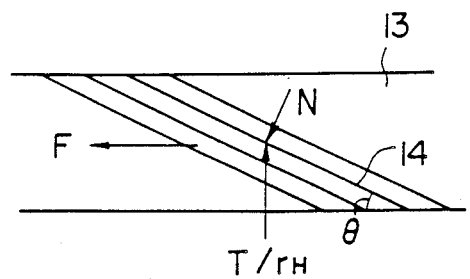
FIG. 3 is a diagram for explaining the return force F appearing on the pinion shaft.

Although not illustrated, the engine starter motor of the present invention may be of any usual structure such as those illustrated in FIGS. 1 and 2. Therefore the starter motor of the present invention may comprises an electric motor, a unidirectional clutch connected to the motor and having an output shaft, the unidirectional clutch exhibiting a drag torque appearing when the unidirectional clutch is being rotated in an idle direction, a speed reduction unit connected at one end to the output shaft of the unidirectional clutch, and a pinion shaft having a pinion gear for engaging and driving an engine ring gear and connected to the speed reduction unit through helical splines.

As shown in FIG. 4, the unidirectional clutch 4 of the present invention comprises a clutch outer member 5 having a frictional surface 5a on its inner circumference, a clutch inner member 9 having a frictional surface 9a on its outer circumference and defining between it and the frictional surface 5a of the clutch outer member 5 a plurality of wedge-shaped spaces 4a. A plurality of rollers 10 are disposed within the wedge-shaped spaces 4a defined between the clutch outer member 5 and the clutch inner member 9, and a plurality of compression springs 30 are mounted in order to urge the rollers 10 into frictional engagement with the frictional surfaces 5a and 9a of the members 5 and 9, respectively.

FIG. 5 illustrates the relationship between a reactive force R on the roller 10 from the frictional surface 5a of the clutch outer member 5 and the frictional surface 9a of the clutch inner member 9 and the spring force P of the compression spring 30 acting on the roller 10. The angle defined between the frictional surface 5a of the clutch outer member 5 and the frictional surface 9a of the clutch inner member 9 is indicated by $\alpha$, and the angle of direction of the spring force P with respect to a tangent at the point of contact of the roller 10 to the frictional surface 9a of the clutch inner member 9 is indicated by $\gamma$. Then the reaction force R can be expressed by the following equation:

$$R = P \frac{\cos(\gamma - \alpha)}{\sin\alpha}.$$

Since the drag torque T of the unidirectional clutch 4 can be expressed by the following equation:

$$T = R \times n \times r \times \mu$$

where,
n: number of the rollers 10
r: radius of the frictional surface of the clutch inner member
$\mu$: friction coefficient of the roller contacting surfaces,
the drag torque T can be expressed by the following equation:

$$T = P \frac{\cos(\gamma - \alpha)}{\sin\alpha} \times n \times r \times \mu$$

According to the present invention, the engine starter motor is arranged such that the drag torque of the unidirectional clutch 4 as converted into a torque on the pinion shaft is equal to or smaller than the drag torque when the unidirectional clutch is mounted on the pinion shaft.

In other words, the drag torque T is determined to satisfy the following equation:

$$T \leq To/g$$

where,
To: drag torque at which a return force F on the pinion shaft 13 with a unidirectional (over-running) clutch mounted thereon does not exceed an operating force on the pinion shaft 13 by a solenoid 20; and
g: speed reduction ratio between the over-running clutch and the pinion shaft.

This relationship may be advantageously fulfilled by selecting the spring force P of the compression spring 30. In other words, the spring 30 of the engine starter motor of the present invention is selected to have a spring force P that is weaker by an amount corresponding to the speed-reduction ratio as compared to that of the starter motor in which the unidirectional clutch 4 is mounted to the pinion shaft 13.

As described above, since the starter motor of the present invention satisfies the above relationship $T \leq To/g$, the structure as illustrated in FIG. 1 or 2 in which the unidirectional clutch 4 is mounted on a rotary shaft other than the pinion shaft 13, the return force F which appears on the pinion shaft 13 when the started engine drives the pinion 16 is so limited so as not the exceed the operating force of the plunger 20 or 26 acting on the pinion shaft 13, whereby the movement of the pinion 16 is stable and damage to the various components of the engine and the starter motor is prevented. Also, when the spring force P of the spring 30 alone is adjusted to satisfy the above relationship, most parts of the unidirectional clutch 4 of the already existing starter motor can be used as they are without the need for any modifications to apply the present invention.

While the above-described engine starter motor of the present invention has the spring 30 having a decreased spring force P as one of the preferable factors to satisfy the equation $T \leq To/g$ from the view point of the clutch capacity the number n of the rollers 10, the radius r of the frictional surface r of the clutch inner member 9, and the like can equally be selected alone or in combination as understood from the above equation of the drag torque $T = R \times n \times r \times \mu$.

Also, although, in the above-described embodiment, an over-running clutch having the rollers 10 disposed in the wedge-shaped spaces defined between the clutch outer member 5 and the clutch inner member 9 is used as the unidirectional clutch 4, the present invention can be equally applied to an engine starter motor comprising a unidirectional clutch having a drag torque such as a sprag clutch.

Further, while the engine starter motor of the above embodiment comprises two or three shafts in which the pinion shaft 13 is disposed on the axis different from that of the armature rotary shaft 3, the present invention can be equally applicable to the engine starter having two or more idle shafts. Alternatively, the engine starter motor in which the armature rotary shaft and the pinion shaft are coaxially disposed. Thus, the present invention can be equally applicable to an engine starter motor of the type in which the rotational power of the unidirectional clutch is transmitted to the pinion through a speed reduction mechanism.

Also, the large gear 12 and the tube 22 of the engine starter motor illustrated in FIG. 2 are formed as an integral member, the large gear 12 and the tube 22 may be separately formed and assembled into one piece by such as by a press-fit.

As has been described, the drag torque of the unidirectional clutch is decreased by an amount corresponding to the speed reduction ratio in the engine starter motor in which the rotational power from the unidirectional clutch is transmitted to the pinion through the speed reduction mechanism the return force acting on the pinion shaft upon the pinion is driven by the started engine is not disadvantageously excessively large, enabling the engine starter motor and the engine components to be prevented from being damaged. Further, the operating life of the engine starter motor is advantageously long and the undesirable movement of the pinion which causes noise is eliminated.

What is claimed is:
1. An engine starter comprising:

an electric motor;

a unidirectional clutch connected to said motor and having an output shaft, said unidirectional clutch exhibiting a drag torque as said unidirectional clutch is being rotated in an idling direction;

a speed reduction unit connected to one end to said output shaft of said unidirectional clutch; and a pinion shaft having a pinion gear for engaging and driving an engine ring gear and connected to said speed reduction unit through helical splines; wherein said drag torque satisfies the following equation:

$$T \leq T_0/g$$

where,

T: drag torque;

To: drag torque at which a return force F on the pinion shaft with an over-running clutch mounted thereon does not exceed on operating force on the pinion shaft by a solenoid; and g: speed reduction ratio between the over-running clutch and the pinion shaft; and whereby the arrangement being such that said drag torque of said unidirectional clutch as converted into a torque on said pinion shaft is equal to or smaller than a drag torque of a unidirectional clutch mounted on said pinion shaft, said torque on said pinion shaft as said pinion is driven being limited so as not to exceed an operating force acting on said pinion.

2. An engine starter as claimed in claim 1, wherein said unidirectional clutch comprises a clutch outer member, a clutch inner member, a plurality of rollers disposed between said clutch outer member and said clutch inner member for frictionally connecting said clutch outer member and said clutch inner member, and springs for urging said rollers into frictional engagement with said clutch outer member and said clutch inner member, said drag torque T of said unidirectional clutch being expressed by the following equation:

$$T = P \frac{\cos(\tau - \alpha)}{\sin\alpha} \times n \times r \times \mu$$

where,

P: spring force $\alpha$: angle defined between the frictional surfaces of the clutch outer and inner members $\tau$: angle of directional of the spring force with respect to a tangent at the point of contact of the roller to the frictional surface of the clutch inner member n: number of rollers r: radius of the frictional surface of the clutch inner member $\mu$: friction coefficient of the roller contacting surfaces.

3. An engine starter as claimed in claim 2, wherein said spring force P of said springs is weaker by an amount corresponding to a speed-reduction ratio of said speed-reduction ratio between said clutch and said pinion shaft.

* * * * *